United States Patent [19]

MacNeary

[11] Patent Number: 5,377,977
[45] Date of Patent: Jan. 3, 1995

[54] COMBINATION GOLF CLUB PUTTER AND REPAIR TOOL

[76] Inventor: John P. MacNeary, 345 Vine Hill Rd., Santa Cruz, Calif. 95065

[21] Appl. No.: 100,131
[22] Filed: Jul. 30, 1993
[51] Int. Cl.⁶ .............................................. A01B 1/04
[52] U.S. Cl. ................................. 273/32 B; 273/162 F
[58] Field of Search ............. 273/162 F, 162 R, 32 B, 273/32 A, 32 R, 32 D, 32 H; 7/118; 81/3.35; 30/155; 172/371, 373, 378, 372

[56] References Cited

U.S. PATENT DOCUMENTS

| 3,049,182 | 8/1962 | Pelow | 273/32 B |
| 3,364,508 | 1/1968 | Garrett | 7/118 |
| 3,825,961 | 7/1974 | Klein | 7/118 |
| 4,856,132 | 8/1989 | Burns et al. | 7/118 |
| 4,862,970 | 9/1989 | Hlavacek | 273/162 R |
| 4,925,190 | 5/1990 | Learned | 273/162 F |
| 4,955,609 | 9/1990 | Kassen | 273/162 F |

Primary Examiner—Mark S. Graham
Attorney, Agent, or Firm—Jeffrey A. Hall

[57] ABSTRACT

A golf green repair tool is mounted within the shaft of a golf club. The repair tool has a elongated support member mounted within the shaft and is secured to a housing having a slot in a wall thereof and being secured within the hand grip end of the shaft. A prong element is hingedly secured within the housing and includes a first member, a second member, and a base element having and engagement notch. The first member of the prong element includes an elongated depression providing a grip for hand operated extension of the prong element from the housing to a golf green repair orientation. A prong lock includes an engagement bar secured within the housing and mounted adjacent to the prong element and positioned so that the prong element presses against and pivots about the engagement bar as the prong element is extended form the housing so that when the prong element is in an opened, extended position, the engagement bar engages the engagement notch in the base element of the prong.

15 Claims, 2 Drawing Sheets

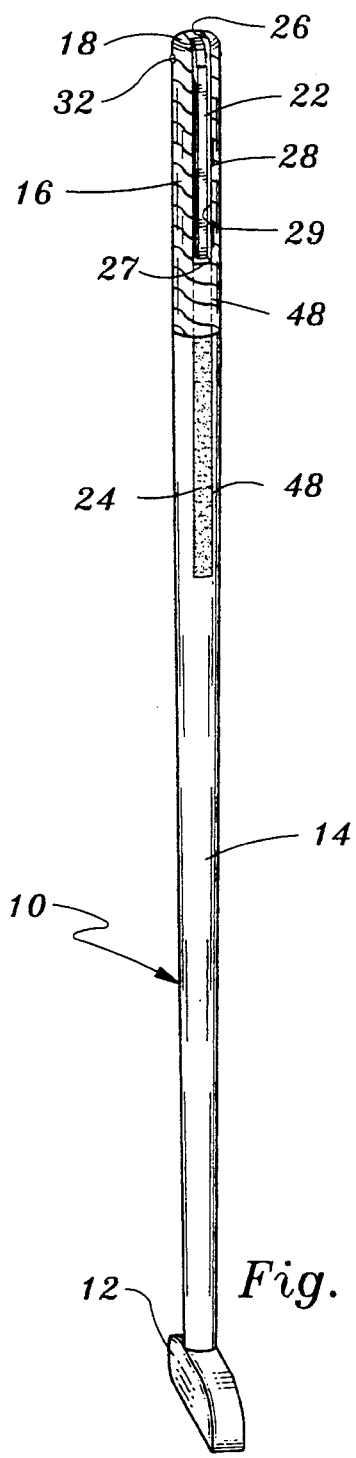
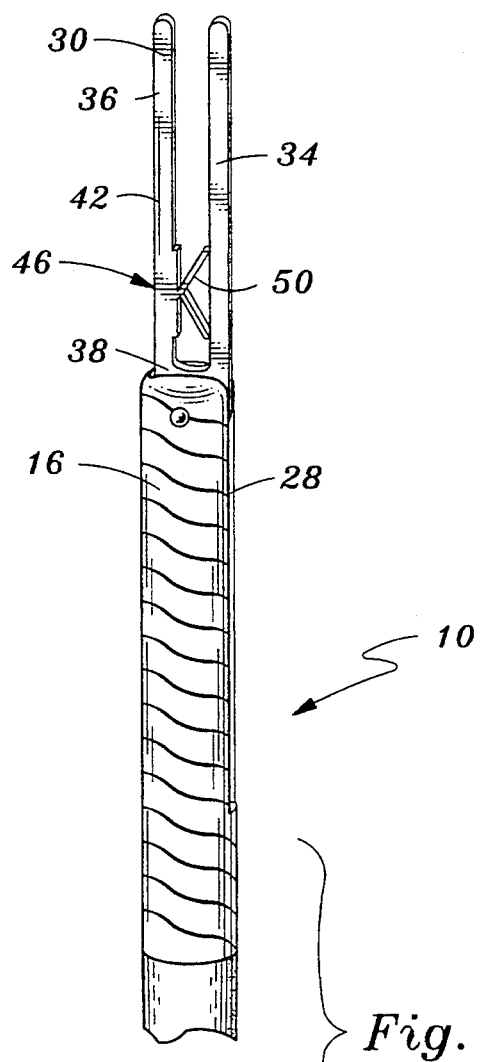
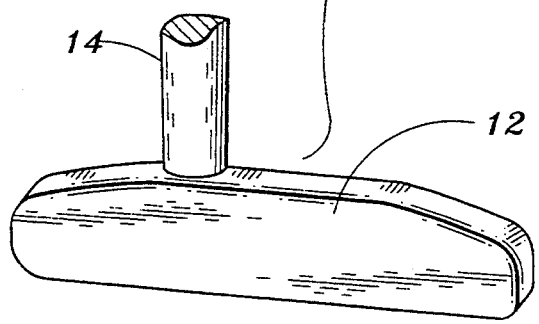
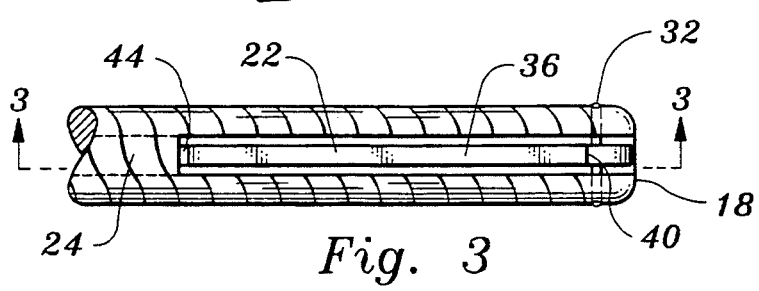

COMBINATION GOLF CLUB PUTTER AND REPAIR TOOL

BACKGROUND OF THE INVENTION

1. Field of Invention The present invention relates to golf clubs, and more particularly to a golf club mounted and operated turf repair tool for repairing a damaged golfing green surface from ball and club marks.

2. Description of Prior Art Numerous tools for repairing ball and club marks on golfing greens have been proposed and implemented. Representative examples of such prior repair tools are disclosed in U.S. Pat. Nos. 3,185,483 issued to Klynman and 3,774,913 issued to Dien. Of more recent vintage are combination golf club and repair tools as disclosed in U.S. Pat. Nos. 4,799,684, issued to Rango, 4,892,314 issued to Rango, and 4,925,190 issued to Learned.

Such prior tools were either provided as a separate implement which the golfer would take from his or her pocket or purse, or provided as a part of a golf club. Although the tools provided in combination with the golf club were an improvement over the prior art, they all suffer from significant limitations. For example, U.S. Pat. No. 4,892,314 issued to Rango disclosed a golf club having a removeable divit repair device secured within the handle of the club. The user would have to unscrew a cap, remove the tool, and then bend down to repair the turf. Such golf club tool combination therefore could not be used from a standing, upright position. In U.S. Pat. No. 4,925,190 issued to Learned a cap element housing a turf repair tool is disclosed where the tool is housed in a removeable cap at the handle end of the golf club. To use the tool, the cap was removed and the tool extended out of the club. Such tool could be used from a standing upright position, however, the cap extension having a hollow interior detracted from the feel and balance of the club, thereby significantly limiting its application. Moreover, such combination did not provide a stable tool for turf repair due to a somewhat unstable mounting within the shaft. Such limitations have undoubtedly been a reason these combination golf club and tools have not received widespread acceptance.

The basis of the present invention is the recognition by the inventor herein that the problem of turf and golf green repair is intimately linked to the lack, in the prior art, of a turf repair tool which may be used by the user while standing in an erect position, which does not require significant alterations in the balance, look, or "feel" of the golf club, and which is efficient and convenient to use regardless of the age or physical capability of the user.

Accordingly, it is the primary object of this invention to provide an improved golf club putter and turf repair tool for repairing damaged golf greens which is extremely reliable, efficient and easy to use, which may be used while standing in an upright position, and which does not significantly alter the golf club's balance, weight, appearance, or "feel".

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a combination golf club putter and turf repair tool, comprises, a golf club having a bail striking clubhead mounted to an elongated shaft and a portion of said shaft having a hand grip secured about a portion of the shaft adjacent to an opposite end of the shaft and including an aperture in the shaft in said portion of the shaft adjacent to said opposite end of the shaft, a golf green repair tool, comprising: an elongated support member secured within said shaft and extending adjacent to said opposite end of the shaft; a cylindrical housing operably secured to said elongated support member and including at least one elongated slot in a wall thereof; a prong element hingedly secured within said cylindrical housing allowing extension of said prong element through said elongated slot so that the prong element operably extends from said opposite end of the shaft; said prong element includes a first member and a second member secured to a base element having an engagement notch therein; said first member includes a grip means allowing for hand operated extension of the prong element to an operating position; and a prong lock means for securing said prong element in an open position allowing extension of said prong element through said elongated slot in said cylindrical housing to a golf green repairing orientation.

The prong lock means preferably includes at least one engagement bar secured within said cylindrical housing and mounted adjacent to said prong element. The engagement bar is operably positioned so that said prong element presses against and pivots against the engagement bar as the prong element is extended from the cylindrical housing so that when said prong dement is operably extended from the cylindrical housing said engagement notch in said base element engages said engagement bar on the prong element securing the prong element in an extended position.

In accordance with the present invention there is also provided a golf green repair tool, comprising: a cylindrical housing having an aperture therein; an elongated support element secured to said housing; an elongated handle extension having a slot therein housing said cylindrical housing and said elongated support element, said handle extension being of sufficient length for permitting a player to operate said tool to repair said golf green by gripping said handle extension while standing erect; said handle extension being a golf club having an elongated shaft with a ball striking clubhead secured to an end of said shaft and a portion of an elongated hand grip mounted about a portion of said shaft adjacent to an opposite end of said shaft which comprises one end of said handle extension attached to said cylindrical housing, said clubhead for holding said tool in a golf green repair orientation being substantially the reverse of a normal playing orientation of said golf club, for operating said tool to repair the golf green; a prong element hingedly secured within said cylindrical housing allowing extension of said prong element through said aperture so that said prong element may be operably extended from said opposite end of the shaft; said prong element includes a first member and a second member secured to a base element having an engagement notch therein; said first member includes a grip means allowing for hand operated extension of the prong element to a golf green repair orientation; and a prong lock having an engagement bar secured within said cylindrical housing and mounted adjacent to said a prong element; said engagement bar being operably positioned so that said prong element presses against and pivots against the engagement bar as the prong element is extended from the cylindrical housing engaging said engagement bar in said engagement notch in said base element, thereby securing said prong element in a golf green repair orientation.

BRIEF DESCRIPTION OF THE DRAWINGS

The accompanying drawings, which are incorporated in and constitute a part of the specification, illustrate a preferred embodiment of the invention, and together with a general description given above and the detailed description of the preferred embodiment given below, serve to explain the principles of the invention.

FIG. 1 is a perspective view of an embodiment incorporating the teachings of the present invention.

FIG. 2 is a side perspective view of the combination golf club putter and repair tool showing an extended prong, according to the invention.

FIG. 3 is a side view showing the repair tool in a folded position, according to the invention.

DESCRIPTION OF THE PREFERRED EMBODIMENTS

Figure 4:
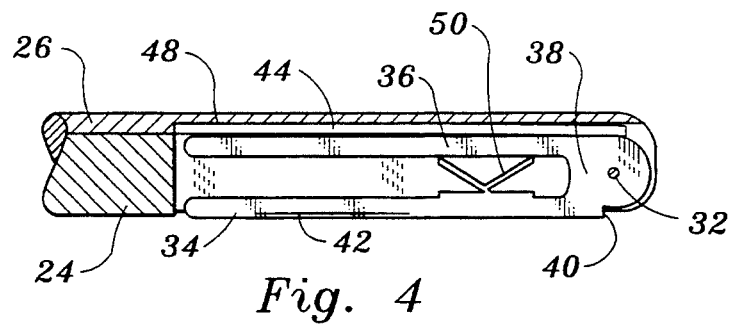
FIG. 4 is a sectional view through 3—3 showing the prong, engagement notch, and engagement bar, according to the invention.

Reference will now be made in detail to the present preferred embodiments of the invention as illustrated in the accompanying drawings.

In accordance with the present invention, there is provided, in combination with a golf club having a ball striking clubhead mounted to an elongated shaft and a portion of said shaft having a hand grip secured about a portion of the shaft adjacent to an opposite end of the shaft and including an aperture in the shaft in said portion of the shaft adjacent to said opposite end of the shaft, a golf green repair tool, comprising: an elongated support member secured within said shaft and extending adjacent to said opposite end of the shaft; a cylindrical housing operably secured to said elongated support member and including at least one elongated slot in a wall thereof; a prong element hingedly secured within said cylindrical housing allowing extension of said prong element through said elongated slot so that the prong operably extends from said opposite end of the shaft; said prong element includes a first member and a second member secured to a base element having an engagement notch therein; said first member includes a grip means allowing for hand operated extension of the prong element to an operating position; and a prong lock means for securing said prong element in an open position allowing extension of said prong element through said elongated slot in said cylindrical housing to a golf green repairing orientation.

In FIG. 1 the combination golf club putter and turf repair tool are shown as golf club 10 having ball striking clubhead 12 mounted to an elongated shaft 14 and a portion of said shaft having a hand grip 16 secured to a portion of the shaft adjacent to an opposite end 18 of golf club 10. Shaft 14 includes an aperture 20 adjacent to said opposite end of the shaft 18. A golf green and turf repair tool 22 is secured within shaft 14.

Figure 5:
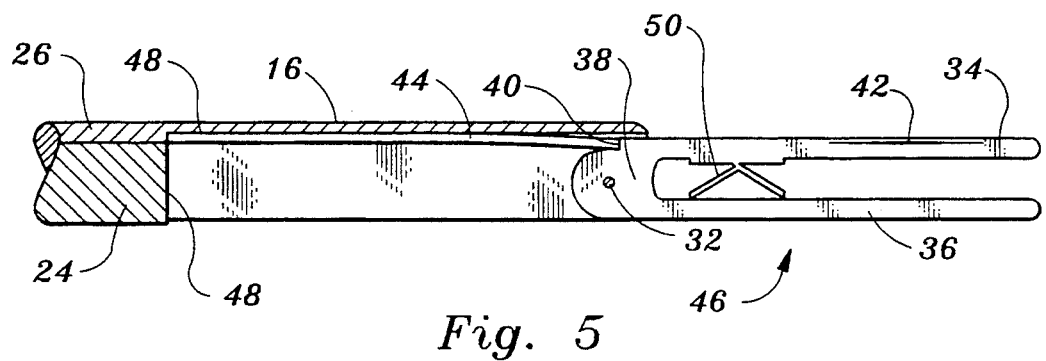
FIG. 5 is a sectional view through 3—3 showing the prong extended and engagement bar 44 engaged in notch 40, according to the invention.

As shown in FIGS. 3, 4, and 5, the golf green repair tool 22 is mounted on an elongated support member 24 which is secured within shaft 14. Support member 24 extends adjacent to end 18 of shaft 14, preferably 3 to 4 inches from the top of shaft 14 and may be secured within shaft 14 by adhesives 48, screws, nut and bolt, or the like, but preferably by adhesives. Support member 24 is preferably a aluminum dowel, however, other durable, resilient, and lightweight supports may be used such as a tubular plastic shaft, rubber tubing or dowel, or lightweight polymer forms and may be secured within shaft 14 by adhesives or mechanical fasteners well known in the art. Housing 26 is secured to support member 24 by adhesives 48, however, other fastening means such as screws or clamps may be used. Housing 26 is preferably cylindrical in shape and composed of a durable, light weight material such as plastic, rubber, or urethane, however, other shapes and materials may readily be substituted. A slot 28 in housing 26 allows extension of prong element 30 through wall 29 of the housing.

As shown in FIGS. 3, 4, and 5 prong element 30 is hingedly secured within housing 26 by hinge 32 allowing rotation of prong 30 out of slot 28 to an extended golf green repair orientation 46. Prong element 30 is operably extended from end 18 of shaft 14 and includes a first member 34 and a second member 36 forming laterally spaced projections for repairing a golf green and are secured to a base element 38 having an engagement notch 40 therein. Base element 38 is preferably permanently mounted housing 26. First member 34 of prong element 30 preferably includes a grip means comprising an elongated depression or notch 42 in first member 34 allowing for hand operated extension of prong element 30 to an operating position. Depression 40 is held onto by the user to facilitate removal of prong 30 from housing 26 and preferably an edge of first member 34 extends slightly beyond the edge of hand grip 16 allowing access to depression or notch 40 and first member 34 best seen in FIGS. 3 and 4. Prong 30 preferably includes a substantially K-shaped member 50 secured between the first and second members 34 and 36 of prong 30. The K-shaped member 50 provides lateral support for prong 30 and allows for smoothing and leveling operations with prong 30 as shown in FIGS. 2 and 5.

Prong lock means are provided by engagement bar 44 secured within housing 26 and mounted adjacent to prong element 30 preferably with adhesives 48. Engagement bar 44 is preferably a flat parallel spring composed of metal, however, other durable, resilient materials may be used, such as composites or thermoplastics. Engagement bar 44 is positioned so that prong element 30 presses against and pivots against engagement bar 44 as prong element 30 is extended from housing 26, so that when prong 30 is operably extended from housing 26 engagement notch 40 in base element 38 engages engagement bar 44 on prong element 30 and thereby secures prong element 30 in and extended and golf green repairing orientation.

According to another embodiment of the invention a golf green repair tool is provided, comprising a cylindrical housing having an aperture therein; an elongated support element secured to said housing; an elongated handle extension having a slot therein and housing said cylindrical housing and said elongated support element, said handle extension being of sufficient length for permitting a player to operate said tool to repair said golf green by gripping said handle extension while standing erect; said handle extension being a golf club having an elongated shaft with a ball striking clubhead secured to an end of said shaft and a portion of an elongated hand grip mounted about a portion of said shaft adjacent to an opposite end of said shaft which comprises one end of said handle extension attached to said cylindrical housing, said clubhead for holding said tool in a golf green repair orientation being substantially the reverse of a normal playing orientation of said golf club, for operating said tool to repair the golf green; a prong element hingedly secured within said cylindrical housing allowing extension of said prong element through said aperture so that said prong element may be operably extended from said opposite end of the shaft; said prong element includes a first member and a second member secured to a base element having an engagement notch therein; said first member includes a grip means allowing for hand operated extension of the prong element to a golf green repair orientation; and a prong lock having an engagement bar secured within said cylindrical housing and mounted adjacent to said prong dement; said engagement bar being operably positioned so that said prong element presses against and pivots against the engagement bar as the prong element is extended from the cylindrical housing engaging said engagement bar in said engagement notch in said base element thereby securing said prong element in a golf green repair orientation.

Figure 6:
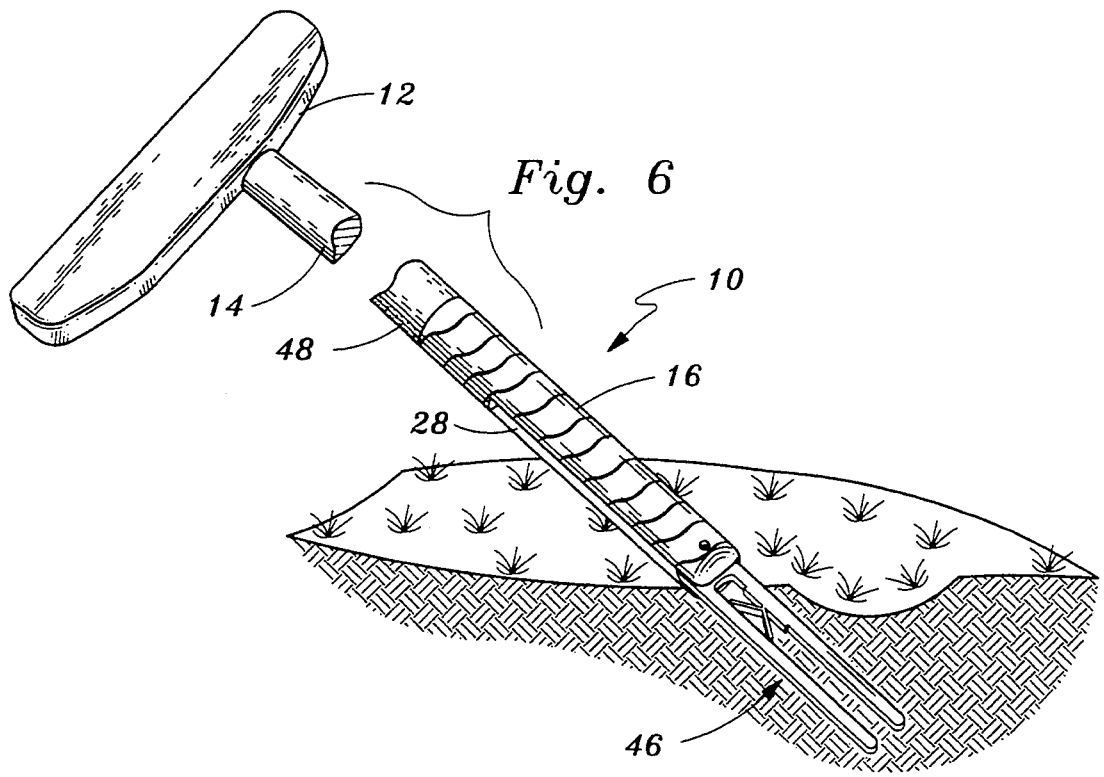
FIG. 6 shows the repair tool in a golf green repairing orientation, according to the invention.

In operation and use the golf club and golf green repair tool of the present invention is convenient, efficient, and unobtrusive. The tool 22 is operated by a player holding golf club 10 in a golf green repair orientation 46 as shown in FIG. 6. The clubhead 12 being held in substantially the reverse of a normal playing orientation. Shaft 14 provides a handle extension of tool 22 and permits the player to repair the golf green from damage from golf balls while standing upright.

Prong element 30 may be used in a forward inclined relation to the golf green or turf, or may be used to laterally flatten the turf using the K-shaped member 50 in combination with first member 34 and second member 36. Shaft 14 is gripped by the player and may be used in a standing, squatting, or sitting position. The player can easily extend prong element 30 from housing 26 by grasping the edge of first member 34 having elongated depression 42 and pulling prong element 30 through aperture 20 and slot 28 and to an operable extended position projecting in an opposite direction from clubhead 12. When the player is finished repairing the golf green or turf prong element 30 is folded back through aperture 20 and slot 28 into housing 26. By applying pressure on prong element 30 so as to fold it back within housing 26, engagement bar 44 slides out of engagement notch 40 in base element 38 and is returned to an adjacent parallel orientation in relation to first member 34 and second member 36 of prong element 30.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the applicant's general inventive concept.

What is claimed is:

1. In combination with a golf club having a ball striking clubhead mounted to an elongated shaft and a portion of said shaft having a hand grip secured about a portion of the shaft adjacent to an opposite end of the shaft and including an aperture in the shaft in said portion of the shaft adjacent to an opposite end of the shaft, a golf green repair tool, comprising:

an elongated support member secured within said shaft and extending adjacent to said opposite end of the shaft;

a cylindrical housing operably secured to said elongated support member and including at least one elongated slot in a wall thereof;

a prong element hingedly secured within said cylindrical housing allowing extension of said prong element through said elongated slot so that the prong element operably extends from said opposite end of the shaft; said prong element including a first member and a second member secured to a base element having an engagement notch therein; said first member including a grip means allowing for hand operated extension of the prong element to an operating position; and a prong lock means for securing said prong element in an open position allowing extension of said prong element though said elongated slot in said cylindrical housing to a golf green repairing orientation.

2. The golf green repair tool of claim 1 wherein said elongated support member comprises a dowel.

3. The golf green repair tool of claim 1 wherein said elongated support member comprises an aluminum shaft.

4. The golf green repair tool of claim 1 wherein said prong element is hingedly secured within said cylindrical housing by a hinge pivotally secured to the cylindrical housing.

5. The golf green repair tool of claim 1 wherein said grip means include an elongated depression in said first member of said prong providing a grip surface for hand positioning of said prong in a golf green repairing orientation.

6. The golf green repair tool of claim 1 wherein said prong lock means includes an engagement bar secured within said cylindrical housing and mounted adjacent to said prong element; said engagement bar is operably positioned so that said prong element presses against and pivots against the engagement bar as the prong element is extended from the cylindrical housing, so that when prong element is operably extended from the cylindrical housing said engagement notch in said base element engages said engagement bar on the prong element securing the prong element in and extended position.

7. The golf green repair tool of claim 6 wherein said engagement bar comprises a flat parallel spring.

8. The golf green repair tool of claim 1 wherein said prong element further includes a substantially K-shaped member secured between said first and said second member of said prong element for support of said first and second member and for providing a lateral turf repair surface.

9. A golf green repair tool, comprising:

a cylindrical housing having an aperture therein;

an elongated support element secured to said housing;

an elongated handle extension having a slot therein housing said cylindrical housing and said elongated support element, said handle extension being of sufficient length for permitting a player to operate said tool to repair said golf green by gripping said handle extension while standing erect;

said handle extension being a golf club having an elongated shaft with a ball striking clubhead secured to an end of said shaft and a portion of an elongated hand grip mounted about a portion of said shaft adjacent to an opposite end of said shaft which comprises one end of said handle extension attached to said cylindrical housing, said clubhead for holding said tool in a golf green repair orientation being substantially the reverse of a normal playing orientation of said golf club, for operating said tool to repair the golf green:

a prong element hingedly secured within said cylindrical housing allowing extension of said prong element through said aperture so that said prong element may be operably extended from said opposite end of the shaft; said prong element includes a first member and a second member secured to a base element having an engagement notch therein; said first member includes a grip means allowing for hand operated extension of the prong element to a golf green repair orientation; and a prong lock having an engagement bar secured within said cylindrical housing and mounted adjacent to said prong element; said engagement bar being operably positioned so that said prong element presses against and pivots against the engagement bar as the prong element is extended from the cylindrical housing engaging said engagement bar in said engagement notch in said base element thereby securing said prong element in a golf green repair orientation.

10. The golf green repair tool of claim 9 wherein said elongated support member comprises a dowel.

11. The golf green repair tool of claim 9 wherein said elongated support member comprises an aluminum shaft.

12. The golf green repair tool of claim 9 wherein said prong element is hingedly secured within said cylindrical housing by a hinge pivotally secured within the cylindrical housing.

13. The golf green repair tool of claim 9 wherein said grip means comprises an elongated depression in said first member of said prong providing a grip surface for hand positioning of said prong in a golf green repairing orientation.

14. The golf green repair tool of claim 9 wherein said engagement bar comprises a flat parallel spring.

15. The golf green repair tool of claim 9 wherein said prong element further includes a substantially K-shaped member secured between said first and said second member of said prong element for support of said first and second member and for providing a lateral turf repair surface.

* * * * *